(12) United States Patent
McGhee

(10) Patent No.: US 6,256,899 B1
(45) Date of Patent: Jul. 10, 2001

(54) GUIDE FOR A POWER CUTTING TOOL

(76) Inventor: George D. McGhee, 36276 Mountville Rd., Middleburg, VA (US) 20117

( * ) Notice: Subject to any disclaimer, the term of this patent is extended or adjusted under 35 U.S.C. 154(b) by 0 days.

(21) Appl. No.: 09/314,310

(22) Filed: May 19, 1999

(51) Int. Cl.[7] .................................................. B23Q 17/22
(52) U.S. Cl. ................................. 33/640; 33/630; 33/628
(58) Field of Search ............................. 33/41.1, 42, 484, 33/486, 628, 630, 640

(56) References Cited

U.S. PATENT DOCUMENTS

| | | | |
|---|---|---|---|
| 1,577,569 | * 3/1926 | Donley | 33/41.1 |
| 2,773,526 | 12/1956 | Hopla . | |
| 3,258,844 | * 7/1966 | Godman | 33/486 |
| 4,128,030 | * 12/1978 | Kundikoff | 83/745 |
| 4,299,034 | * 11/1981 | DeBetta | 33/630 |
| 4,356,748 | 11/1982 | Tilton . | |
| 4,483,071 | 11/1984 | te Kolsté . | |
| 4,507,869 | * 4/1985 | Stude | 33/42 |
| 4,607,434 | 8/1986 | Francis . | |
| 4,638,564 | 1/1987 | Burrows . | |
| 4,825,559 | * 5/1989 | Santos | 33/630 |
| 4,930,221 | * 6/1990 | Taylor | 33/811 |
| 5,035,061 | * 7/1991 | Bradbury et al. | 33/430 |
| 5,103,566 | * 4/1992 | Stebe | 33/42 |
| 5,309,642 | * 5/1994 | McGinnis | 33/32.2 |
| 5,353,515 | * 10/1994 | Alvis et al. | 33/640 |
| 5,390,425 | 2/1995 | Gilberts . | |
| 5,472,029 | 12/1995 | Ketch . | |

\* cited by examiner

*Primary Examiner*—Diego Gutierrez
*Assistant Examiner*—Lydia M. De Jesús
(74) *Attorney, Agent, or Firm*—Mattingly, Stanger & Malur

(57) ABSTRACT

A guide for a hand held power cutting tool of the type having a blade extending through a base plate, includes a stem element having distance gradations thereon and a cutting tool guide piece attached to an end of the stem element. A shoe element is provided for engaging surfaces of a work piece and an anvil element is adjustably connected to the shoe element whereby the anvil element is movable longitudinally with respect to the shoe element. The anvil element engages an upper surface of the shoe element to form an opening therewith through which the stem element slidably passes so that the stem element is adjustable longitudinally with respect to the opening to position the guide piece at a location whereby when an edge of the base plate engages a front face of the guide piece, the blade will cut the work piece at a desired length.

9 Claims, 6 Drawing Sheets

GUIDE FOR A POWER CUTTING TOOL

BACKGROUND OF THE INVENTION

1. Field of the Invention

The present invention relates to an improved guide for a hand held power cutting tool and, more particularly, to a guide for a hand held power cutting tool of the type having a blade extending through a base plate and wherein the guide is adjustable to compensate for an offset distance between an edge of the base plate and the blade of the cutting tool.

2. Description of the Related Art

When cutting a work piece, such as a 2×4 board, to fit snugly between two existing parallel elements, ordinary practice requires the use of a rule to measure the inside distance and transfer that measurement to the work piece, where a scriber and a carpenter's square are used to mark the cut line, which is usually followed freehand with a hand held power cutting tool. The accuracy of cutting using this method often varies. Time and motion are wasted compared to the use of the present invention, a tool which, after being adjusted to work with a particular hand held power cutting tool, first measures an inside distance and secondly is placed on the work piece and used to guide that particular hand held power cutting tool to produce a cut-off piece equaling the inside distance measured.

Numerous types of guides for use in connection with hand held power cutting tools are known in the art. Many such prior art devices, however, have the disadvantages of being unduly complicated and often difficult to use. Other such prior art devices encounter difficulties in aligning the guide device in spaced relation to the desired cut line to allow for the distance between the blade and the edge of the base plate through which the blade extends.

SUMMARY OF THE INVENTION

It is an object of the present invention to provide a guide for a hand held power cutting tool which measures distances between objects when used as an inside sliding caliper and which is easily adjustable to accommodate cutting tools having different blade offsets.

A further object of the invention is to provide a guide for a hand held power cutting tool which may be used with various sizes of cutting tools and in which means are provided to position the straight edge of the guide a predetermined distance from a desired cut line, depending on the offset position of the blade extending through the base plate.

Another object of the invention is to provide a guide for a hand held power cutting tool in which the guide is first positioned on a work piece to be cut and part of the cutting tool mates with a straight edge portion of the guide to assure a straight and accurate cut.

A still further object of the invention is to provide a guide for a hand held power cutting tool provided with a stem element having distance gradations thereon in order to set the guide to produce a cut-off piece whose length corresponds to the measurement indicated on the stem element.

The present invention achieves the above and other objects by providing a guide for a hand held power cutting tool of the type having a blade extending through a base plate wherein the guide is adjustable to compensate for an offset distance between an edge of the base plate and the blade to permit use as an inside sliding caliper. The guide includes a stem element having distance gradations thereon and a cutting tool guide piece attached to an end of the stem element. A shoe element is provided for engaging surfaces at the free end of a work piece and an anvil element is adjustably connected to the shoe element whereby the shoe element is movable longitudinally with respect to the anvil element. The anvil element engages an upper surface of the shoe element to form an opening therewith through which the stem element slidably passes with the stem element being adjustable longitudinally with respect to the opening to position the guide piece at a location whereby when an edge of the base plate of the cutting tool engages the front face of the guide piece, the blade will cut the work piece at a desired length.

These and other features and advantages of the present invention will become more apparent with reference to the following detailed description and drawings.

DETAILED DESCRIPTION OF THE PREFERRED EMBODIMENTS

Figure 1:
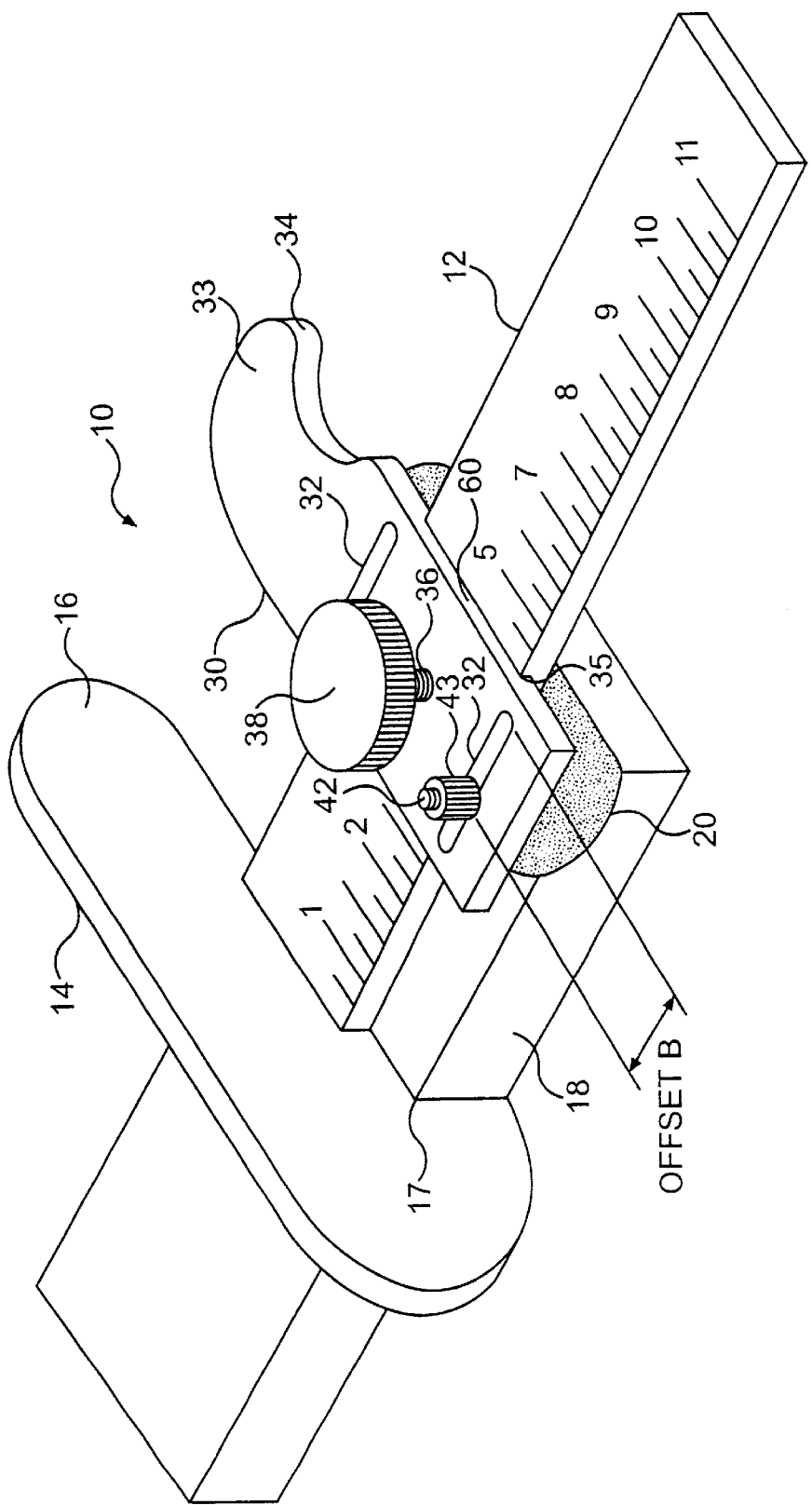
FIG. 1 is a perspective view from the top right end of a guide for a hand held power cutting tool according to the present invention.
Figure 2:
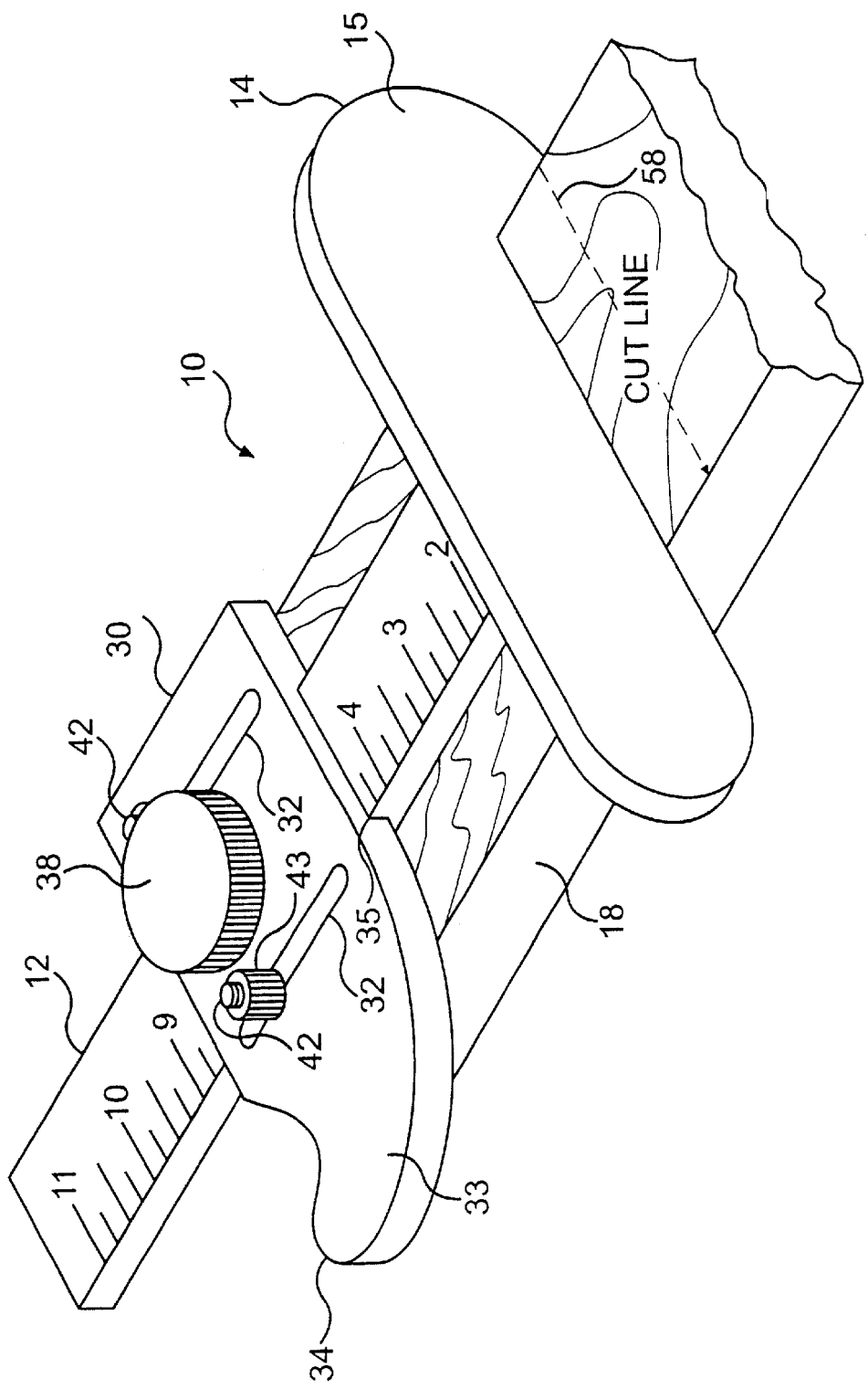
FIG. 2 is a perspective view from the top left end of a guide for a hand held power cutting tool according to the present invention.

Referring to FIGS. 1–7 of the drawings, a guide for a hand held power cutting tool, generally referred to by the numeral 10, is shown. The guide 10 includes a stem element 12 having measurement gradations thereon. Attached to the inner end of the stem element is a cutting tool guide piece 14 having a flat front face 15 and a back face 16. The guide piece 14 is positioned at a right angle to the longitudinal axis of the inner end of the stem element 12. Guide piece 14 further includes a notch 17 at one end on the bottom thereof for engagement with a surface of a work piece 18 such as a 2×4 or a plank.

Figure 3:
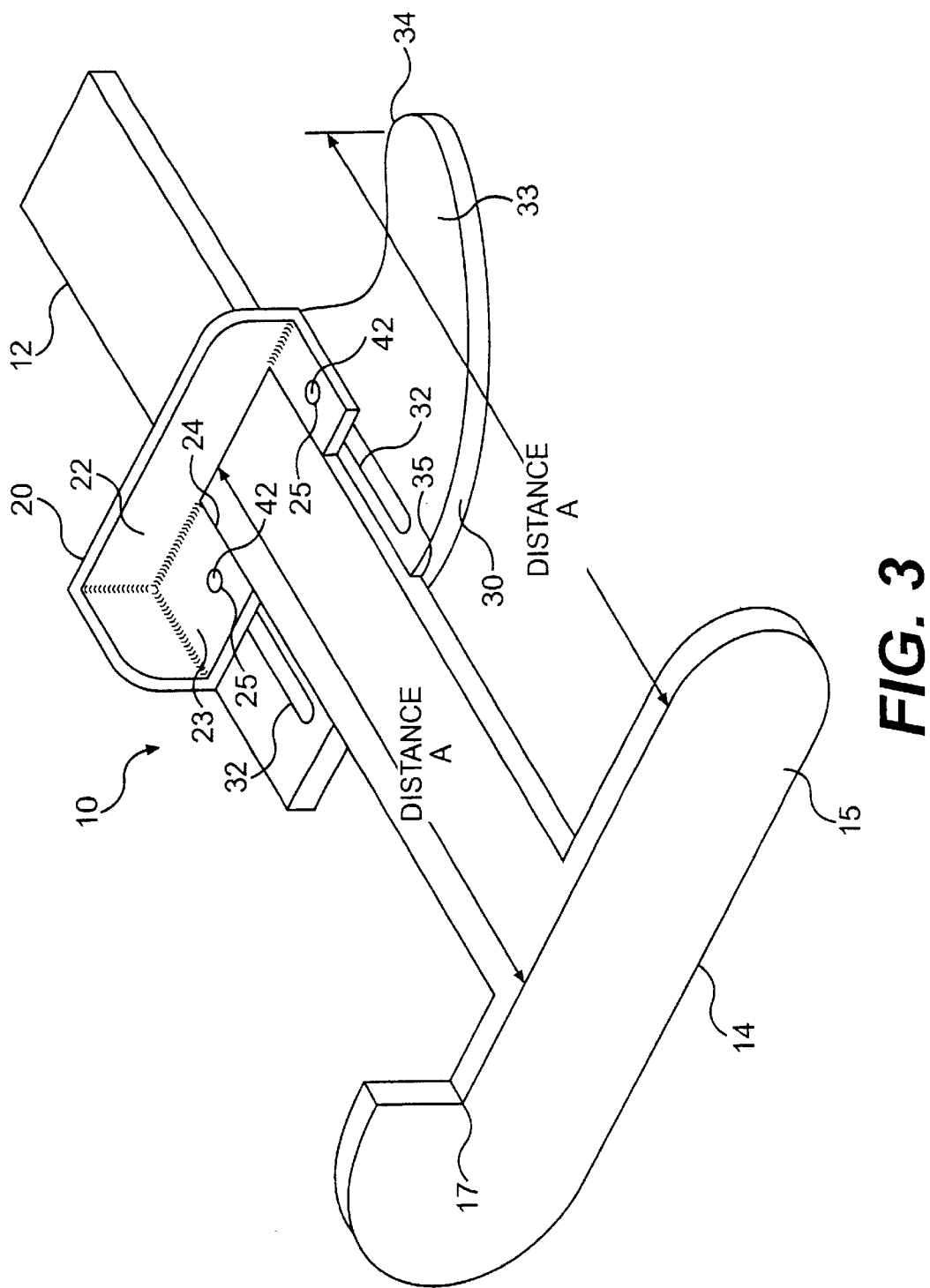
FIG. 3 is a perspective view from the bottom left end of a guide for a hand held power cutting tool according to the present invention showing an anvil element in an unadjusted position relative to a shoe element.
Figure 4:
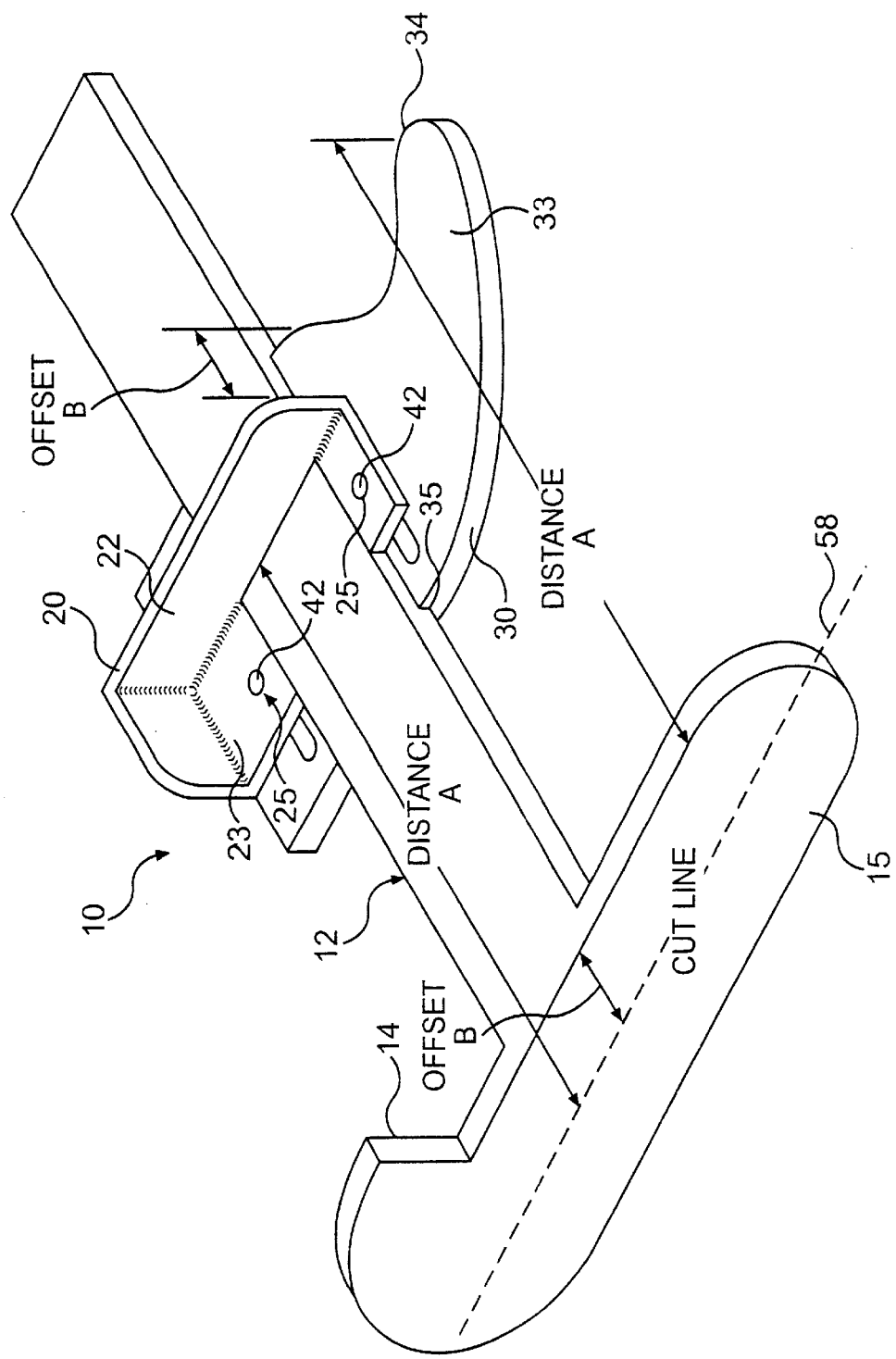
FIG. 4 is a perspective view from the bottom left end of a guide for a hand held power cutting tool according to the present invention wherein the shoe element has been adjustably positioned relative to the anvil element to compensate for an offset distance between an edge of a base plate of the cutting tool and the blade extending through the base plate.

The guide further includes a shoe element 20 for engaging surfaces at a free end of a work piece. The shoe element includes three right angled inner faces which form a three-sided cap 22 for engaging surfaces at the free end of a work piece as shown in FIGS. 3 and 4. As shown in FIG. 3, the top surface 23 of the cap may include a notch 24 through which stem element 12 passes. Shoe 20 also includes a pair of spaced holes 25 in the top surface 23 for a purpose to be described later.

Figure 5:
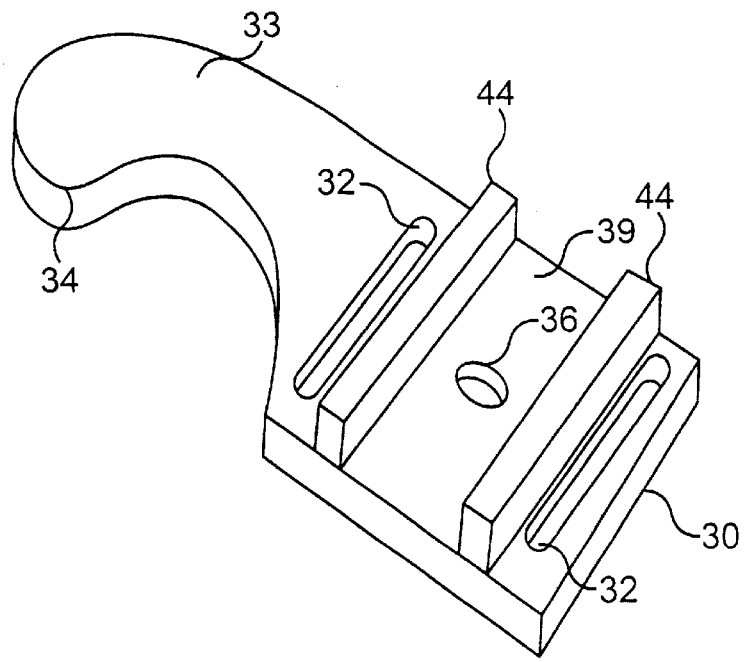
FIG. 5 is an enlarged bottom perspective view showing an embodiment of an anvil element of the present invention.

The guide further includes an anvil element 30 having a pair of spaced elongated slots 32 in the main body portion thereof which extend all the way through the main body and an anvil portion 33 extending outwardly at one end thereof in a direction perpendicular to the stem element with the anvil portion 33 having a backwardly facing tip 34. The anvil element 30 further has a notch 35 on the bottom thereof for receiving stem element 12 slidably therein. The main portion of the anvil element 30 is further provided with a threaded hole 36 into which a knob handled set screw 38 is threadably engaged. Alternatively, as shown in FIG. 5, the anvil element 30 may be provided with a pair of spaced walls 44 projecting from a lower surface thereof to form a channel 39 through which the stem element 12 may slidably pass.

A pair of bolts 42 having nuts 43 thereon extend upwardly through the holes 25 in the shoe element 20 and through the slots 32 in the anvil element 30 to fasten the shoe element 20 to the anvil element 30 in a manner such that the stem element 12 is secured between the shoe element 20 and the anvil element 30 by tightening the set screw 38. When the nuts 43 on the bolts 42 are loosened, the shoe element 20 may be adjusted longitudinally with respect to the anvil element 30. The total length of any adjustment is limited to the length of the slots 32.

Figure 6:
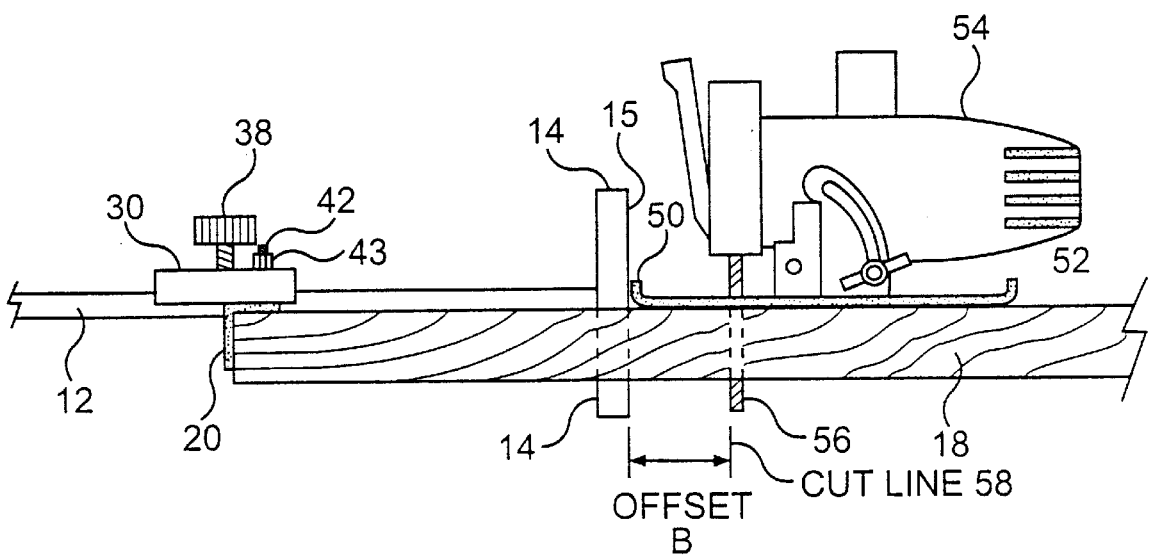
FIG. 6 is a front view showing a power cutting tool abutting against a guide piece of the guide of the present invention and making a cut in a work piece.

As shown in FIG. 6, the guide of the present invention is particularly intended for use with a hand held power cutting tool such as a saw 54 having a blade 56 which extends through a base plate 52 having an outer upturned edge 50. As further shown in FIG. 6, the blade 56 is offset from the outer face of the edge 50 by a distance identified as offset B. In order to make an accurate and straight cut along cut line 58 shown in FIGS. 2, 4 and 6, it is necessary to position the guide 10 such that the guide piece 14 is offset from the cut line 58 by a distance which equals the distance the blade 56 of the cutting tool is offset from the outer edge 50 of the base plate.

In order to adjust the guide to compensate for the offset distance B between the edge 50 of the base plate and the blade 56, nuts 43 are loosened and the shoe element 20 is adjusted longitudinally forward with respect to anvil element 30 until it has been offset a distance which is equal to the distance identified as offset B in FIG. 6. The distance offset B that the shoe 20 is adjusted is also shown in FIG. 4.

In use of the guide of the present invention, the shoe or cap 20 is positioned at the right end of a work piece 18 as shown in FIG. 1. The nuts 43 on the screws 42 and the set screw 38 are then loosened and the anvil element 30 is moved to the right, as shown in FIG. 1, a distance equal to the distance offset B by which the blade 56 is offset from the outer face of the edge 50 of the base plate. The nuts 43 are then tightened and the stem element 12 having the distance gradations thereon is then adjusted by sliding the stem element through the opening between the anvil element 30 and the shoe element 20 until the desired distance is shown by the back edge 60 of the anvil element and the gradations on the stem element 12 as shown in FIG. 1. The set screw 38 is then tightened to secure the stem element In place. In FIG. 1, the guide is set so that a portion of the work piece 18 will be cut which is 5.5 inches long.

Figure 7:
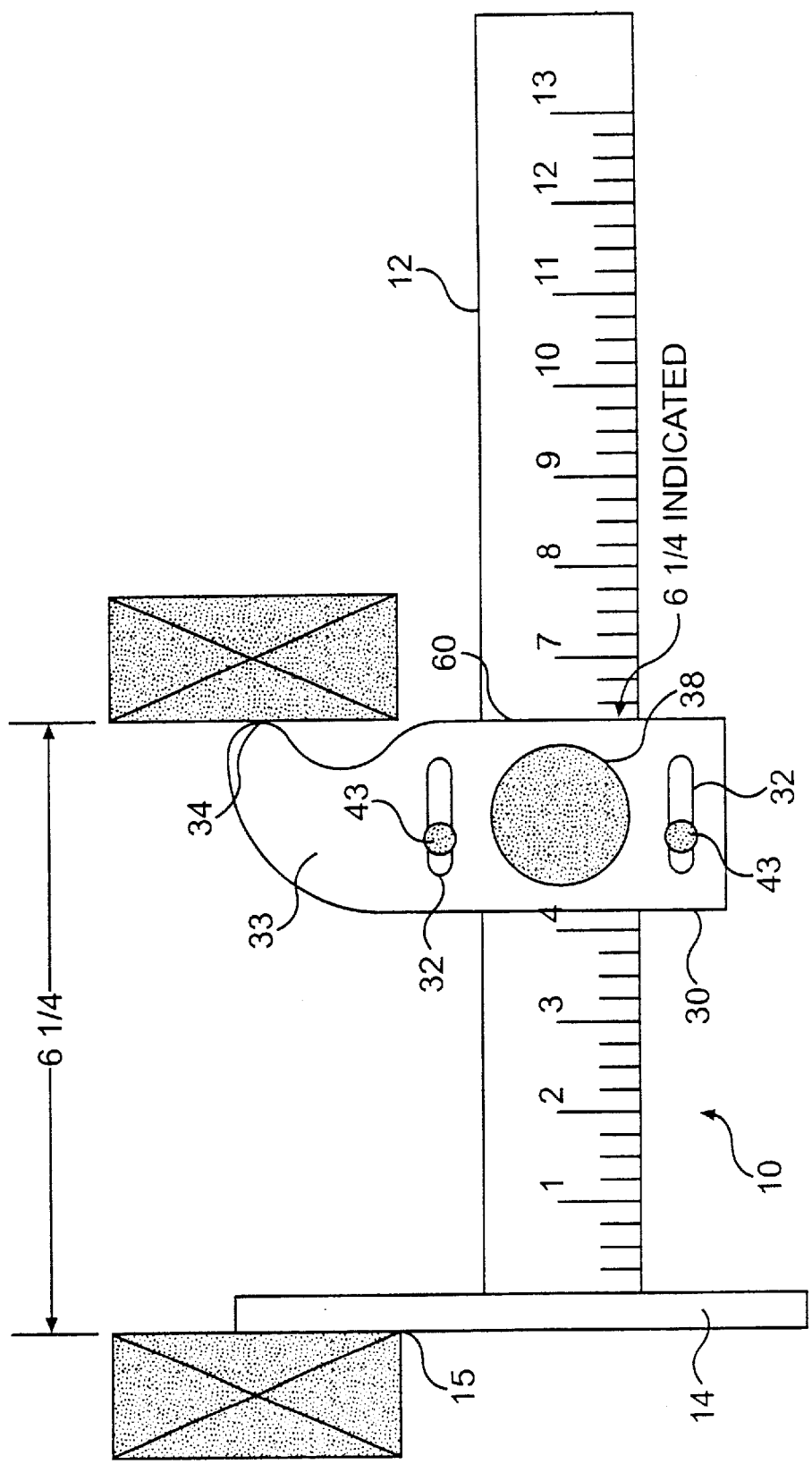
FIG. 7 is a top plan view of the guide for a hand held power cutting tool according to the present invention illustrating the taking of a measurement between two elements when the guide is used as an inside sliding caliper.

In FIG. 3, the guide 10 is shown in a position where the anvil element 30 is positioned as far forwardly as the slots 32 will allow. In this position, the distance A from the inside face 22 of the shoe element 20 to the front face 15 of the guide piece 14 is the same as the distance A from the tip 34 of the anvil portion 33 of the anvil element 30 to the front face 15 of the guide piece 14. As shown in FIG. 4, when the shoe element 20 is adjusted forwardly with respect to the anvil element 30 a distance equal to the offset distance between the edge 50 of the base plate 52 of a particular hand held power cutting tool and the blade 56 of that tool (offset B in FIG. 6), the distance A from the inside face 22 of the shoe or cap 20 to the cut line 58 is the same distance A from the tip 34 of the anvil element 30 to the front face 15 of the guide piece 14. Accordingly, the tip 34 of the anvil element 30 functions, in conjunction with front face 15 of guide piece 14, as a sliding inside caliper capable of taking measurements as shown in FIG. 7, so that if set screw 38 is tightened and the cutting guide tool 10 is then placed on the work piece 18 as in FIG. 2 and that same particular power cutting tool makes a cut, its base edge 50 being guided by the front face 15 of the guide piece 14, the length of the resulting cut-off piece will equal the measurement taken by the cutting guide tool 10 when used as an inside caliper, as in FIG. 7. Since point 34 of the anvil portion 33 corresponds to the reading shown on the stem portion 12 at the back edge 60 of the anvil element 30, the tool 10 provides a means by which to easily read the measurement taken, as shown in FIG. 1 and FIG. 7.

In use of the guide of the present invention, the tool normally is held with the right hand and the saw is operated with the left hand. The guide thereby may be considered a left-handed tool.

Numerous other modifications and adaptations of the present invention will be apparent to those skilled in the art and thus, it is intended by the following claims to cover all such modifications and adaptations which fall within the true spirit and scope of the invention.

What is claimed is:

1. A guide for a hand held power cutting tool of the type having a blade extending through a base plate, said guide being adjustable to compensate for an offset distance between an edge of said base plate and said blade and comprising:

a stem element having distance gradations thereon, a cutting tool guide piece attached to an end of said stem element, said guide piece having a front face for engaging said edge of said base plate;

a shoe element for engaging surfaces of a work piece; and an anvil element adjustably connected to said shoe element whereby said shoe element is movable longitudinally with respect to said anvil element;

said anvil element engaging an upper surface of said shoe element to form an opening therewith through which said stem element slidably passes, said stem element being adjustable longitudinally with respect to said opening to position said guide piece at a location on said stem such that when said edge of said base plate engages said front face of said guide piece, said blade will cut said work piece at a desired length.

2. A guide for a hand held power cutting tool according to claim 1 wherein said anvil element has an anvil portion extending outwardly at one side thereof in a direction perpendicular to said stem element, and is positioned such that a distance between a back face of said anvil portion and said front face of said guide piece equals a distance measured on said stem element which indicates a length of the work piece to be cut.

3. A guide for a hand held power cutting tool according to claim 1 wherein said anvil element is adjustably connected to said shoe element by bolts attached to said shoe element which extend through elongated slots in said anvil element, said slots extending all the way through said anvil element.

4. A guide for a hand held power cutting tool according to claim 1 which further includes a set screw which passes through a hole in said anvil element to engage said stem element to hold said stem element in a desired position with respect to said anvil element.

5. A guide for a hand held power cutting tool according to claim 1 wherein said anvil element further includes a pair of spaced walls projecting from a lower surface thereof which engage said upper surface of said shoe element to form said opening.

6. A guide for a hand held power cutting tool according to claim 1 wherein said shoe element includes right angled faces forming a three-sided cap for engaging surfaces of said work piece.

7. A guide for a hand held power cutting tool of the type having a blade extending through a base plate, said guide being adjustable to compensate for an offset distance between an edge of said base plate and said blade and comprising:

a stem element having distance gradations thereon;

a cutting tool guide piece attached to an end of said stem element, said guide piece having a front face for engaging said edge of said base plate;

a shoe element for engaging surfaces of a work piece; and an anvil element adjustably connected to said shoe element by bolts attached to said shoe element which extend through slots in said anvil element such that said shoe element is movable longitudinally with respect to said anvil element;

said anvil element having spaced projections on a lower surface thereof which engage an upper surface of said shoe element to form an opening therewith through which said stem slidably passes, said stem being adjustable longitudinally with respect to said opening to position said guide piece at a location on said stem such that when said edge of said base plate engages said front face of said guide piece, said blade will cut said work piece at a desired length.

8. A guide for a hand held power cutting tool according to claim 7 wherein said anvil element has an anvil portion extending outwardly at one side thereof in a direction perpendicular to said stem element, and is positioned such that a distance between a back face of said anvil portion and said front face of said guide piece equals the distance measured on said stem element which indicates a length of the work piece to be cut.

9. A guide for a hand held power cutting tool according to claim 7 which further includes a set screw which passes through a hole in said anvil element to engage said stem element to hold said stem element in a desired position with respect to said anvil element.

* * * * *